United States Patent
Zhang et al.

(10) Patent No.: US 9,145,793 B2
(45) Date of Patent: Sep. 29, 2015

(54) COMBINED CYCLE POWER PLANT WITH ABSORPTION HEAT TRANSFORMER

(71) Applicant: General Electric Company, Schenectady, NY (US)

(72) Inventors: Hua Zhang, Greer, SC (US); Jatila Ranasinghe, Simpsonville, SC (US); Barrett Gardiner, Malta, NY (US)

(73) Assignee: GENERAL ELECTRIC COMPANY, Schenectady, NY (US)

( * ) Notice: Subject to any disclaimer, the term of this patent is extended or adjusted under 35 U.S.C. 154(b) by 315 days.

(21) Appl. No.: 13/668,395

(22) Filed: Nov. 5, 2012

(65) Prior Publication Data

US 2014/0123622 A1    May 8, 2014

(51) Int. Cl.
*F01K 7/22* (2006.01)
*F01K 23/10* (2006.01)
*F02C 6/18* (2006.01)
*F22B 1/18* (2006.01)

(52) U.S. Cl.
CPC ............... *F01K 7/22* (2013.01); *F01K 23/106* (2013.01); *F02C 6/18* (2013.01); *F22B 1/1815* (2013.01); *Y02B 30/62* (2013.01); *Y02B 30/625* (2013.01); *Y02E 20/14* (2013.01); *Y02E 20/16* (2013.01)

(58) Field of Classification Search
CPC ....... F01K 23/106; F01K 7/22; F01K 17/005; F01K 17/025; F01K 17/00; F01K 13/00; F01K 13/006; Y02E 20/14; Y02E 20/16; F24F 29/006; F24F 12/00; F24F 12/003; F25B 25/02; Y02B 30/62; Y02B 30/52; Y02B 30/625; F02C 6/18
USPC ............................ 60/39.182, 39.53, 645–681
See application file for complete search history.

(56) References Cited

U.S. PATENT DOCUMENTS

| | | | |
|---|---|---|---|
| 4,531,374 A * | 7/1985 | Alefeld | 62/79 |
| 4,779,675 A * | 10/1988 | Stuven et al. | 165/104.12 |
| 7,168,233 B1 * | 1/2007 | Smith et al. | 60/39.182 |
| 7,669,418 B2 * | 3/2010 | Chino et al. | 60/645 |
| 2011/0132008 A1 | 6/2011 | Su | |
| 2011/0132741 A1 | 6/2011 | Sechrist et al. | |

* cited by examiner

*Primary Examiner* — William H Rodriguez
*Assistant Examiner* — Alain Chau
(74) *Attorney, Agent, or Firm* — Nixon & Vanderhye P.C.

(57) ABSTRACT

A combined cycle power plant utilizes an absorption heat transformer to improve plant efficiency. A heat recovery steam generator receives exhaust from a gas turbine and generates steam for input to a steam turbine. The heat recovery steam generator includes a low pressure economizer, an intermediate pressure economizer and a high pressure economizer. The absorption heat transformer is in fluid communication with the low pressure economizer. The absorption heat transformer includes a feed water circuit that draws exhaust water from the low pressure economizer for heating by the absorption heat transformer and directs heated water to at least one of the intermediate pressure economizer and the high pressure economizer.

14 Claims, 2 Drawing Sheets

COMBINED CYCLE POWER PLANT WITH ABSORPTION HEAT TRANSFORMER

BACKGROUND OF THE INVENTION

The invention relates to improving plant efficiency in a combined cycle gas turbine power plant and, more particularly, to a combined cycle power plant including an absorption heat transformer.

In a typical combined cycle system, a gas turbine combusts a fuel/air mixture which expands to turn the turbine and drive a generator for the production of electricity. The hot gases of combustion exhaust into a heat recovery steam generator in which water is converted to steam in the manner of a boiler. Steam thus produced drives a steam turbine, typically comprising high, intermediate and low pressure turbines, in which additional work is extracted to drive a further load such as a second generator for producing additional electric power. In some configurations, the gas and steam turbines drive a common generator and, in others, drive different generators.

In a combined cycle gas turbine power plant, the energy is not sufficiently utilized in the low pressure economizer section, where the exhaust section of flue gas has a lower temperature. It would be desirable to use the lower grade energy to increase plant efficiency.

Absorption heat transformers (AHT) are devices which transform a large heat resource, which is available at temperature too low for correct thermal matching within an industrial process, in a smaller amount of heat available at a higher temperature level. They differ from traditional heat pumps in that they use no (or a very limited amount of) electrical power or work. Basically, AHTs work on the principle of an absorption inverse cycle: however the net effect is that of transferring an amount of heat (smaller than the originally available) at a higher temperature level. This allows recovering this heat into industrial processes.

BRIEF DESCRIPTION OF THE INVENTION

In an exemplary embodiment, a combined cycle turbine includes a heat recovery steam generator and an absorption heat transformer. The heat recovery steam generator receives exhaust from a gas turbine and generates steam for input to a steam turbine. The heat recovery steam generator includes a low pressure economizer, an intermediate pressure economizer and a high pressure economizer. The absorption heat transformer is in fluid communication with the low pressure economizer. The absorption heat transformer includes a feed water circuit that draws exhaust water from the low pressure economizer for heating by the absorption heat transformer and directs heated water to at least one of the intermediate pressure economizer and the high pressure economizer.

In another exemplary embodiment, a feed water circuit in a combined cycle power plant includes a feed water extraction line communicating exhaust water from the low pressure economizer to the absorption heat transformer. A heat line is divided from the feed water extraction line, and an energy line is divided from the feed water extraction line in parallel with the heat line. The heat line and the energy line are separately input to the absorption heat transformer.

In still another exemplary embodiment, a method of operating a combined cycle turbine includes the steps of receiving, with a heat recovery steam generator, exhaust from the gas turbine and generating, with the heat recovery steam generator, steam for input to the steam turbine, the heat recovery steam generator including a low pressure economizer, an intermediate pressure economizer and a high pressure economizer; drawing exhaust water from the low pressure economizer into an absorption heat transformer; heating, with the absorption heat transformer, the exhaust water from a lower grade energy to a higher grade energy; and directing the heated water to at least one of the intermediate pressure economizer and the high pressure economizer.

DETAILED DESCRIPTION OF THE INVENTION

Figure 1:
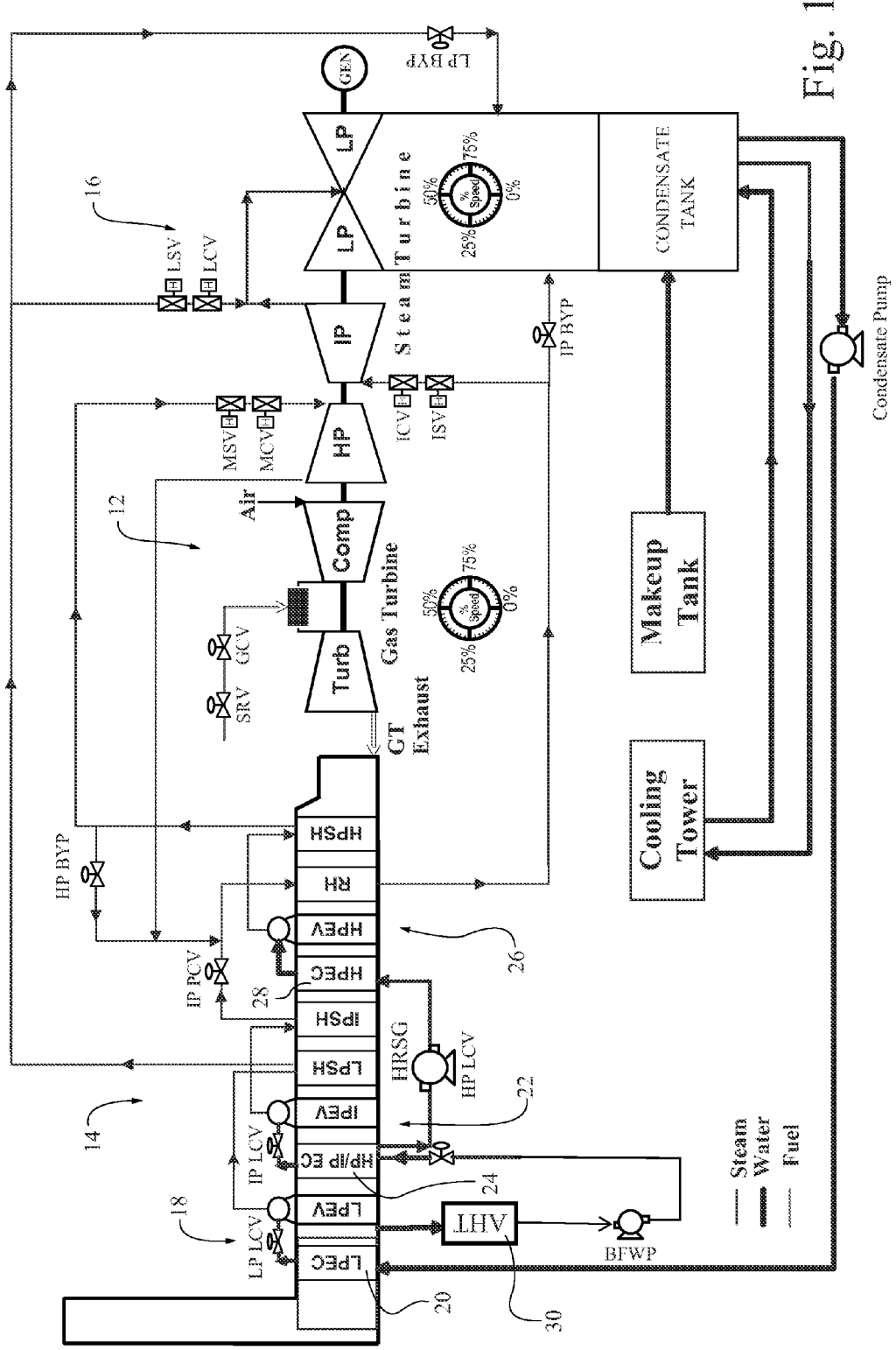
FIG. 1 is a schematic illustration of a combined cycle power plant.

FIG. 1 is a schematic illustration of a combined cycle power plant. The structure and operation of a combined cycle power plant are generally known, and details thereof will not be described. In a typical combined cycle system, a gas turbine 12 combusts a fuel/air mixture, which expands to turn the turbine and drive a generator for the production of electricity. The hot gases of combustion exhaust into a heat recovery steam generator (HRSG) 14 in which water is converted to steam. Steam thus produced drives a steam turbine 16, typically including high, intermediate and low pressure turbines, in which additional work is extracted. Among other parts, the heat recovery steam generator 14 includes a low pressure section 18 with a low pressure economizer 20, an intermediate pressure section 22 with an intermediate pressure economizer 24, and a high pressure section 26 with a high pressure economizer 28.

Figure 2:
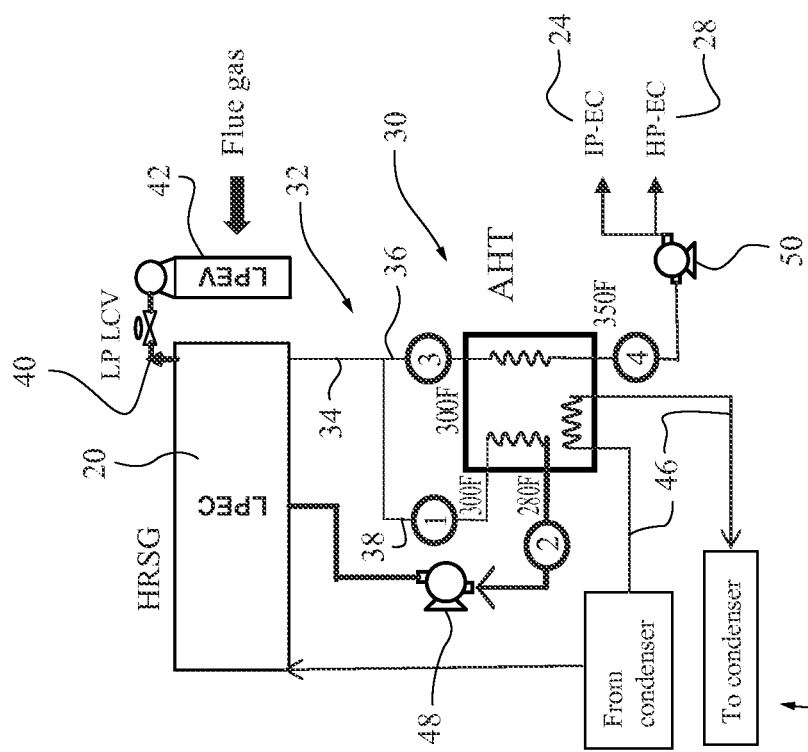
FIG. 2 is a schematic illustration showing the low pressure economizer of the heat recovery steam generator including an absorption heat transformer.

In the system of the described embodiments, an absorption heat transformer (AHT) 30 is provided in fluid communication with the low pressure economizer 20 of the heat recovery steam generator 14. The function and operation of an absorption heat transformer are known, and details thereof will not be described. With reference to FIG. 2, the absorption heat transformer 30 includes a feed water circuit 32 that draws exhaust water from the low pressure economizer 20 for heating by the absorption heat transformer 30 and directs heated water to at least one of the intermediate pressure economizer 24 and the high pressure economizer 28.

The feed water circuit 32 includes a feed water extraction line 34 communicating the exhaust water from the low pressure economizer 20. The feed water extraction line 34 is divided into a heat line 36 in parallel with an energy line 38. As shown in FIG. 2, the heat line 36 and the energy line 38 are input to the absorption heat transformer 30. The circuit 32 also includes an evaporator line 40 that extracts exhaust water from the low pressure economizer 20 to a low pressure evaporator 42. The low pressure evaporator 42 in connection with a low pressure drum generates low pressure steam for the steam turbine to generate power. The low pressure is 50 to 100 psig, preferably 60 to 80 psig.

The absorption heat transformer 30 additionally includes a condenser 44 in communication with the absorption heat transformer 30 via a condenser line 46. The condenser 44 serves to cool the cooling water for the AHT 30. According to a preferred embodiment, the condenser 44 is shared with the steam turbine condenser.

A pump 48 is provided in series with the energy line 38. The pump 48 drives feed water in the energy line 38 back to the low pressure economizer 20.

The absorption heat transformer 30 serves to convert the underused lower grade energy from the low pressure economizer into high grade energy. In an exemplary construction, feed water extracted from the low pressure economizer 20 may be 300° F. It is desirable to increase the temperature of the exhaust water into high grade energy, which includes water temperatures of at least 350° F. Using the absorption heat transformer 30, energy from the energy line 38 can be extracted to heat the feed water in the heat line 36 to at least 350° F. The heated water is then directed to a boiler feed water pump 50 for delivery to the intermediate pressure economizer 24 and/or the high pressure economizer 28.

Figure 3:
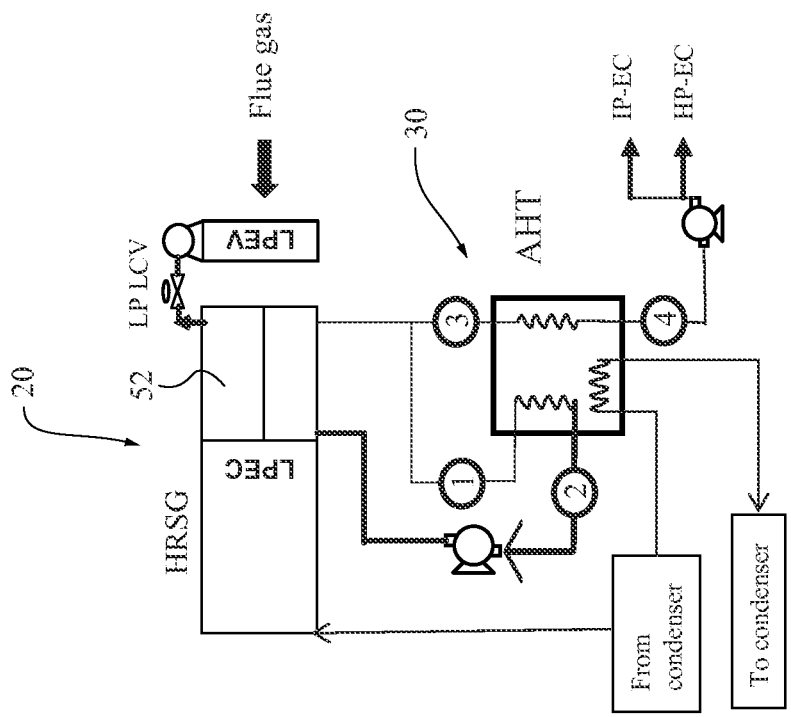
FIG. 3 is a schematic drawing showing an alternative version of the design.

FIG. 3 shows an alternative embodiment, wherein an independent water circuit 52 is interposed between the low pressure economizer 20 and the absorption heat transformer 30. In this embodiment, the absorption heat transformer 30 draws the exhaust water from the low pressure economizer 20 via the independent water circuit 52. The independent water circuit 52 provides advantages for optimal heat transfer between gas turbine flue gas and the LP economizer. The independent circuit 52 for the AHT in the exhaust may give a different water supply temperature for the AHT than that of the embodiment shown in FIG. 2. Decoupling of the water supply to the LP evaporator and the AHT allows for additional optimization for maximizing the efficiency increases.

By incorporating the absorption heat transformer into the combined cycle power plant, overall power plant efficiency can be increased. The system reduces the waste heat in a combined cycle power plant by converting the low grade energy at the last stage of the HRSG into high grade energy, thereby improving power plant efficiency.

While the invention has been described in connection with what is presently considered to be the most practical and preferred embodiments, it is to be understood that the invention is not to be limited to the disclosed embodiments, but on the contrary, is intended to cover various modifications and equivalent arrangements included within the spirit and scope of the appended claims.

What is claimed is:

1. A combined cycle turbine including a gas turbine and a steam turbine, the combined cycle turbine comprising:
   a heat recovery steam generator receiving exhaust from the gas turbine and generating steam for input to the steam turbine, the heat recovery steam generator including a low pressure economizer, an intermediate pressure economizer and a high pressure economizer; and
   an absorption heat transformer in fluid communication with the low pressure economizer, the absorption heat transformer including a feed water circuit that draws exhaust water from the low pressure economizer for heating by the absorption heat transformer and directs heated water to at least one of the intermediate pressure economizer and the high pressure economizer,
   wherein the feed water circuit comprises a feed water extraction line communicating the exhaust water from the low pressure economizer, the feed water extraction line being divided into a heat line in parallel with an energy line, wherein the heat line and the energy line are input to the absorption heat transformer.

2. A combined cycle turbine according to claim 1, wherein the absorption heat transformer further comprises a condenser in communication with the absorption heat transformer via a condenser line.

3. A combined cycle turbine according to claim 2, wherein the condenser is shared with the steam turbine.

4. A combined cycle turbine according to claim 1, wherein the feed water circuit further comprises a pump in series with the energy line, the pump driving feed water in the energy line back to the low pressure economizer.

5. A combined cycle turbine according to claim 4, wherein the heat recovery steam generator comprises a low pressure evaporator, and wherein the feed water circuit comprises an evaporator line that extracts exhaust water from the low pressure economizer.

6. A combined cycle turbine according to claim 1, wherein absorption heat transformer is configured to heat the exhaust water from lower grade energy to high grade energy.

7. A combined cycle turbine according to claim 6, wherein the lower grade energy comprises the exhaust water at less than 300° F., and wherein the high grade energy comprises the heated water at least 350° F.

8. A combined cycle turbine according to claim 1, wherein the heat recovery steam generator comprises an independent water circuit interposed between the low pressure economizer and the absorption heat transformer, the absorption heat transformer drawing the exhaust water from the low pressure economizer via the independent water circuit.

9. A feed water circuit in a combined cycle power plant including a heat recovery steam generator receiving exhaust from a gas turbine and generating steam for input to a steam turbine, the heat recovery steam generator including a low pressure economizer, an intermediate pressure economizer and a high pressure economizer, and an absorption heat transformer in fluid communication with the low pressure economizer in the heat recovery steam generator, the feed water circuit comprising:
   a feed water extraction line communicating exhaust water from the low pressure economizer to the absorption heat transformer;
   a heat line divided from the feed water extraction line; and
   an energy line divided from the feed water extraction line in parallel with the heat line, the heat line and the energy line being separately input to the absorption heat transformer, wherein the absorption heat transformer directs heated water to at least one of the intermediate pressure economizer and the high pressure economizer.

10. A feed water circuit according to claim 9, further comprising an independent water circuit interposed between the low pressure economizer and the absorption heat transformer, the feed water extraction line drawing the exhaust water from the low pressure economizer via the independent water circuit.

11. A feed water circuit according to claim 9, further comprising a condenser line in fluid communication with a condenser of the absorption heat transformer.

12. A feed water circuit according to claim 11, further comprising a pump in series with the energy line, the pump driving feed water in the energy line back to the low pressure economizer.

13. A feed water circuit according to claim 12, wherein the heat recovery steam generator comprises a low pressure evaporator, and wherein the feed water circuit comprises an evaporator line that extracts exhaust water from the low pressure economizer.

14. A method of operating a combined cycle turbine including a gas turbine and a steam turbine, the method comprising:
   receiving, with a heat recovery steam generator, exhaust from the gas turbine and generating, with the heat recovery steam generator, steam for input to the steam turbine, the heat recovery steam generator including a low pressure economizer, an intermediate pressure economizer and a high pressure economizer;

drawing exhaust water from the low pressure economizer into an absorption heat transformer;
heating, with the absorption heat transformer, the exhaust water from a lower grade energy to a higher grade energy; and
directing the heated water to at least one of the intermediate pressure economizer and the high pressure economizer,
wherein the drawing step is practiced by dividing the exhaust water between a heat line and an energy line in parallel with the heat line, the heat line and the energy line being separately input to the absorption heat transformer.

\* \* \* \* \*

UNITED STATES PATENT AND TRADEMARK OFFICE
CERTIFICATE OF CORRECTION

Page 1 of 1

PATENT NO. : 9,145,793 B2
APPLICATION NO. : 13/668395
DATED : September 29, 2015
INVENTOR(S) : Zhang et al.

It is certified that error appears in the above-identified patent and that said Letters Patent is hereby corrected as shown below:

In the Claims:

In Claim 7 at column 4, line 14, change "heated water at least" to --heated water at at least--

Signed and Sealed this
Twenty-ninth Day of March, 2016

Michelle K. Lee
*Director of the United States Patent and Trademark Office*